(12) United States Patent
DeMarco (10) Patent No.: US 11,943,582 B2
(45) Date of Patent: *Mar. 26, 2024

(54) SOUND ENHANCEMENT DEVICE FOR CELL PHONE

(71) Applicant: Chris DeMarco, Monrovia, CA (US)

(72) Inventor: Chris DeMarco, Monrovia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,927

(22) Filed: Feb. 18, 2022

(65) Prior Publication Data

US 2022/0174402 A1    Jun. 2, 2022

Related U.S. Application Data (63) Continuation-in-part of application No. 16/932,452, filed on Jul. 17, 2020, now Pat. No. 11,259,113.

(60) Provisional application No. 62/875,361, filed on Jul. 17, 2019.

(51) Int. Cl.
| | |
|---|---|
| *H04R 1/34* | (2006.01) |
| *H04M 1/03* | (2006.01) |
| *H04R 1/02* | (2006.01) |
| *H04R 1/04* | (2006.01) |

(52) U.S. Cl.
CPC ............ *H04R 1/342* (2013.01); *H04M 1/035* (2013.01); *H04R 1/028* (2013.01); *H04R 1/04* (2013.01); *H04R 2499/11* (2013.01)

(58) Field of Classification Search
CPC .......... H04R 1/342; H04R 1/028; H04R 1/04; H04R 2499/11; H04R 1/035
See application file for complete search history.

(56) References Cited

U.S. PATENT DOCUMENTS

| | | | | |
|---|---|---|---|---|
| 5,867,795 | A * | 2/1999 | Novis | G06Q 20/325 455/566 |
| 2004/0242264 | A1* | 12/2004 | Cho | H04M 1/05 455/575.1 |
| 2013/0048413 | A1* | 2/2013 | Patzer | H04M 1/04 181/199 |
| 2015/0041245 | A1* | 2/2015 | Smith | H04M 1/035 181/202 |

* cited by examiner

*Primary Examiner* — Tuan D Nguyen
(74) *Attorney, Agent, or Firm* — Donn K. Harms

(57) ABSTRACT

A sound enhancing device for improving voice reception of a smartphone microphone is attachable to the rear surface of a smartphone opposite the surface of the smartphone having a display. The device has a deflector in a sliding engagement within a cavity of a housing moveable between a stowed position and a deployed position. A reflective curved area positioned on a first surface of the deflector captures and reflects sound waves from the voice of a user toward a microphone of the smartphone.

16 Claims, 6 Drawing Sheets

SOUND ENHANCEMENT DEVICE FOR CELL PHONE

This application is a continuation in part to U.S. patent application Ser. No. 16/932,452 filed on Jul. 17, 2020, which claims priority to U.S. Provisional Patent Application Ser. No. 62/875,361 filed on Jul. 17, 2019, both of which are incorporated herein in their respective entirety by this reference thereto.

BACKGROUND OF THE INVENTION

1. Field of the Invention

The present invention relates to cellular phones and more recently, smartphones. More particularly, the invention relates to an engageable sound focusing component adapted for sliding, once mounted on the rear surface of a smartphone, which serves to focus the voice of the user into a conventional surface-positioned microphone on such smartphones.

2. Prior Art

Modern cellular phones have evolved into smartphones which provide the user with a large LCD display on a front surface of the phone. This display serves as a computer display for webpages and documents and the like which would normally be displayed on a desktop or laptop computer. Consequently, such smartphone displays are evolved to be ever-larger, to provide the user with more display space to more easily view documents, webpages, maps, and other computer generated imaging.

With the enlargement of such LCD displays on smartphones to maximize their position on the front side of a phone case, manufacturers have had to reposition the other components of the phone. Consequently, the microphone which is employed by the user to speak through during phone calls, has been moved to a location on a bottom edge of the smartphone, or more frequently, to the rear surface of the body of the smartphone adjacent the bottom edge.

With the microphone positioned on the back surface or bottom edge of the smartphone, it is out of a direct line of communication with the voice of a user holding the phone against their ear. This positioning of the microphone on the rear surface by a large portion of smartphone manufacturers has been a constant source of problems for users. A primary problem is that the smartphone user cannot be heard during a phone call because the microphone cannot pick up their voice well in a position on the rear surface of the smartphone. The problem continues to persist even with multiple efforts by manufactures to solve it using software and even secondary microphones positioned to receive a users voice through the ear canal.

The device herein described and disclosed, provides a light weight, easy to attach, solution to the issues suffered by smartphone users with regard to poor voice transmission during a phone call. Moveable between a stowed or retracted position, and deployed position, the device features a parabolic voice reflector which functions as a lens to focus the voice of the user during phone call, directly on a rear area of the phone where such microphones are located.

The forgoing examples of related art and limitations related therewith are intended to be illustrative and not exclusive, and they do not imply any limitations on the voice focusing invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of an easily attached, user deployable, voice transmission enhancing component for a smartphone. The device can be configured for positioning on any smartphone having a substantially planar rear surface.

The device features a housing which is adapted for adhesive engagement upon the rear surface of a smartphone, opposite the front surface conventionally filled by a liquid crystal display (LCD). A sound deflector is slidably engaged within a cavity of the housing. This sound deflector may be translated between a stowed position within the housing and a deployed position projecting slightly from a lower surface of the smartphone.

While the sound deflector may be substantially planar, a more preferred mode of the device herein employs a sound deflector formed of a planar body, which has a parabolic recess formed into a first surface of the planar body which faces toward the mouth of the user when in the deployed position. This parabolic recess is shaped to form a lens to focus the voice of the user toward a microphone of the smartphone conventionally positioned on a rear surface of the body of the smartphone.

The parabolic recess with the deflector in the deployed position significantly enhances the decibel level of the voice of the smartphone user, which is received by the microphone. In addition to boosting the decibel level of the voice to the microphone, it also focuses the voice projected by the user directly to the microphone, thereby also improving frequency response.

In a particularly preferred mode of the device herein, the parabolic recess may also have small recesses or dimples formed into the area of the parabolic recess. The plurality of dimples or small recesses somewhat like a golf boll exterior have shown, in experimentation, to further enhance the decibel level of the voice of the user communicated to the microphone.

With respect to the above description, before explaining at least one preferred embodiment of the herein disclosed smartphone-engageable sound transmission enhancing device in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other components configured to deploy and focus the voice of a smartphone user to microphone reception, and for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Finally, unless provided a different respective definition, the term substantially herein means plus or minus five percent.

It is an object of this invention to provide an easily engaged sound focusing device which enhances the voice transmission of a smartphone user.

It is an additional object of this invention to provide such a voice and sound focusing device, which is user deployable whereby it may be used at the option of the smartphone user.

These and other objects of the invention will be brought out in the following part of the specification, wherein detailed description is for the purpose of fully disclosing the invention without placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only. They are not intended to be limiting or to imply that the device has to be used or positioned in any particular orientation.

Figure 1:
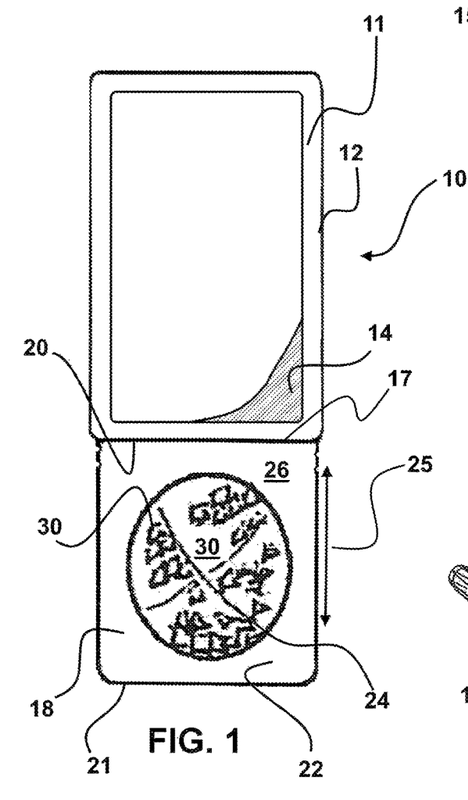
FIG. 1 is an overhead view of the device herein showing a housing of the device adapted to engage with a rear surface of a smartphone using adhesive, and showing the sound deflector with a parabolic recess upon a projecting portion of a deflector which has been translated to a deployed position.

Now referring to drawings in FIGS. 1-13, wherein similar components are identified by like reference numerals, there is seen in FIG. 1 an overhead or plan view of the device 10. As shown, the device 10 includes a housing 12 configured to hold a sliding sound deflector 18 having a distal edge 21, between the stowed and deployed positions noted herein.

Figure 3:
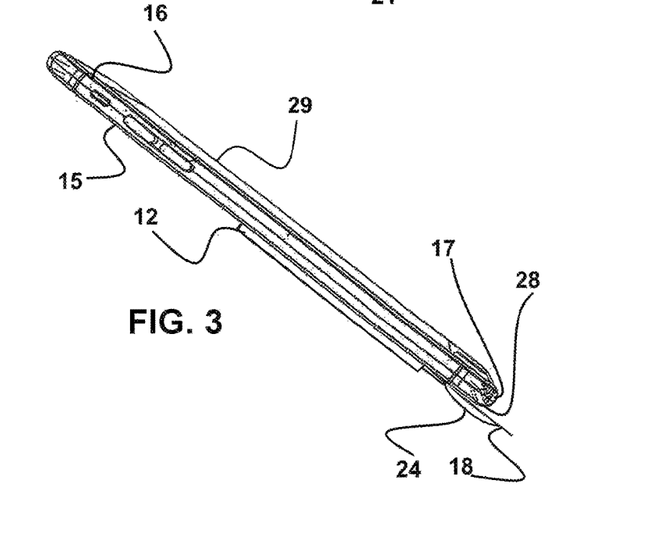
FIG. 3 is a side view of the device as in FIG. 2.

An attachment surface 11 of the housing 12 is adapted for engagement to a rear side of a smartphone 16. By engagement to a rear side of a smartphone 16 is meant herein, an attachment to a rear surface 15 of a smartphone 16 or to the rear surface of phone case engaged therewith. This rear surface 15 is located on the opposite side of the smartphone 16 from the video display 29 (as shown in FIG. 3). Currently, a preferred mode of such an attachment to the rear side of the smartphone 16, employs an adhesive 14 such as a peel and stick type of adhesive 14 surface, which is adhered to either the rear surface 15 of the smartphone 16, or the phone case engaged to the smartphone 16.

Figure 2:
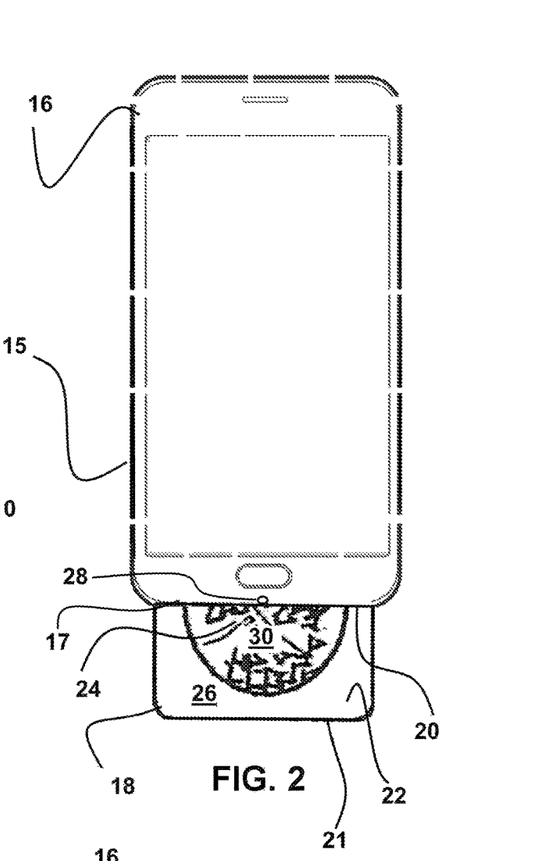
FIG. 2 shows the device as in FIG. 1, operatively engaged to the rear surface of a smartphone, and depicting the parabolic recess in the sound deflector positioned to focus the voice of the user onto the rear positioned microphone.
Figure 4:
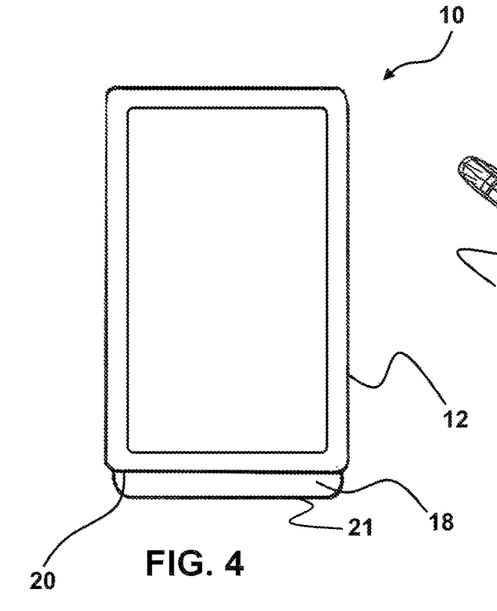
FIG. 4 shows the device of FIG. 1, with the planar deflector body translated to a stowed position within the housing.

Within a cavity 20 of the housing 12 is slidably engaged the sound deflector 18 which is translatable from a retracted or stowed position, such as in FIG. 4, to a deployed position such as is shown in FIG. 2. In all modes of the device 10 herein, while in the deployed position, a projecting portion 25 of the deflector 18 extends between a bottom edge 17 of the smartphone 16, and a distal edge 21 of the deflector 18.

The deflector 18 has a body 22 which has a substantially planar first surface 26, which will function without the noted parabolic or curved recess 24 below, which is configured to help focus sound on a microphone 28 as noted herein. In a particularly preferred mode of the device 10 herein, a curved area of the surface 26, or a curved or parabolic recess 24, is formed into or by curving the first surface 26, at or adjacent to a distal edge 21 of the body 22 of the deflector. By adjacent to the distal edge 21 is meant, that the area of the curved area starts to curve at the distal edge 21 and back toward the cavity 20, or is formed into the surface 26 in a curved area having an edge of the curved areas within 1 inch to ¼ inches of the distal edge 21.

The device 10 as shown in FIGS. 2-3 is in the deployed position with the deflector 18 in the sliding engagement with the housing 12 which is adhered to or otherwise engaged to the rear surface 15 of a smartphone 16. In this deployed position, the reflective curved area 30 shown as the parabolic recess 24, is positioned such that it extends past both sides of a bottom edge (FIG. 6) of the smartphone 16 to which it is operatively engaged. In this deployed position the curved area such as the parabolic surface 24 on the sound deflector 18 will serve to help reflect or redirect the sound waves of the voice of the user of the smartphone 16 toward a microphone 28. Such microphones 28 are conventionally positioned on or adjacent the bottom edge 17 of the smartphone 16 and may be visible only as a small opening communicating to the microphone. Thus, by microphone 28 used herein is meant, a microphone positioned within the phone case itself, which is in communication with an opening in the phone case. As noted, such microphones 28 are conventionally positioned on the bottom edge 17 or immediately adjacent thereto on the rear surface 16. By adjacent is meant within one inch or less of the bottom edge 17.

As shown, in the preferred mode of the device 10, the sound deflector 18 has a reflective curved area 30 shown as a parabolic recess 24, formed by or into the first surface 26 of the body 22 of the sound deflector 18. Of course, the reflective curved area 30 may also be formed by a formation of a curve of the surface 26 itself, by curving a portion of the body 22 of the deflector 18 such as in FIGS. 11-13. As such, as used herein, by reflective curved area 30 is meant, either a curved area formed into the surface 26 of the body 22 of the deflector 18, or a curving of the body 22 itself, to form an area of the surface 26. into a reflective curved area 30. Either type of reflective curved area 30 will be positioned with the deflector 18 in the deployed position, to reflect the sound waves generated by the voice of a user of the smartphone 16, back toward the microphone 28 to increase the DB of the sound waves of the voice of the user which communicate to the microphone 28. This reflective curved area 30 thus forms a reflector and lens which upon contact with such sound waves will reflect them and focus them on the microphone 28 area of the smartphone 16.

The reflective curved area 30 shown as a curved round or elongated recess or curved parabolic recess 24, so situated during use of the device 10 in the deployed position on the smartphone 16, thus serves to gather the sound waves of the voice of the user talking, and act as a reflective lens to focus them in amplified fashion, upon the microphone 28 area of the smartphone 16. This reflection and focusing action, significantly enhances the ability to use the smartphone 16. This is especially true in a noisy environment or when the user angles the bottom edge 17 away from their face, which will normally cause their voice sound waves not to be communicated to the microphone 28, or to be very poorly communicated thereto.

Figure 5:
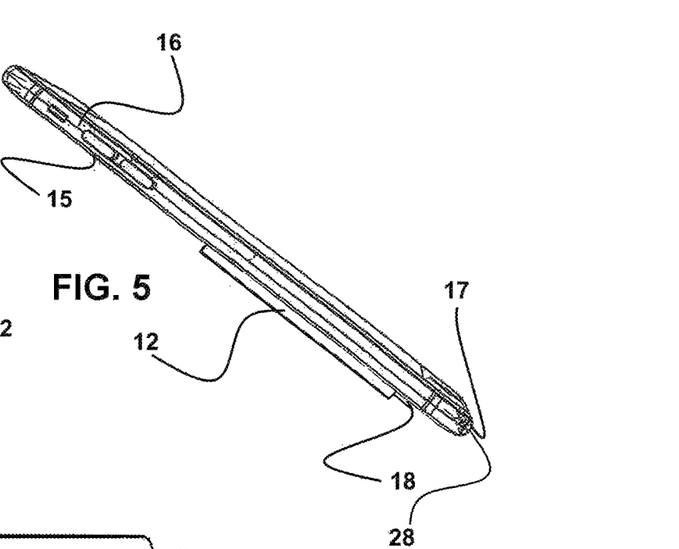
FIG. 5 depicts the device as in FIG. 4, operatively deployed with an oval parabolic recess and showing side-positioned recesses which may be employed to register the deflector to any of multiple positions.

As noted, the device 10 has a stowed configuration which is shown for example in FIGS. 4-5. As can be seen, the sound deflector 18, is translated back within the cavity 20 formed within the housing 12 and the distal edge 21 of the deflector 18 is positioned behind the bottom edge 17 of the smartphone 16, or barely projecting therefrom.

Figure 6:
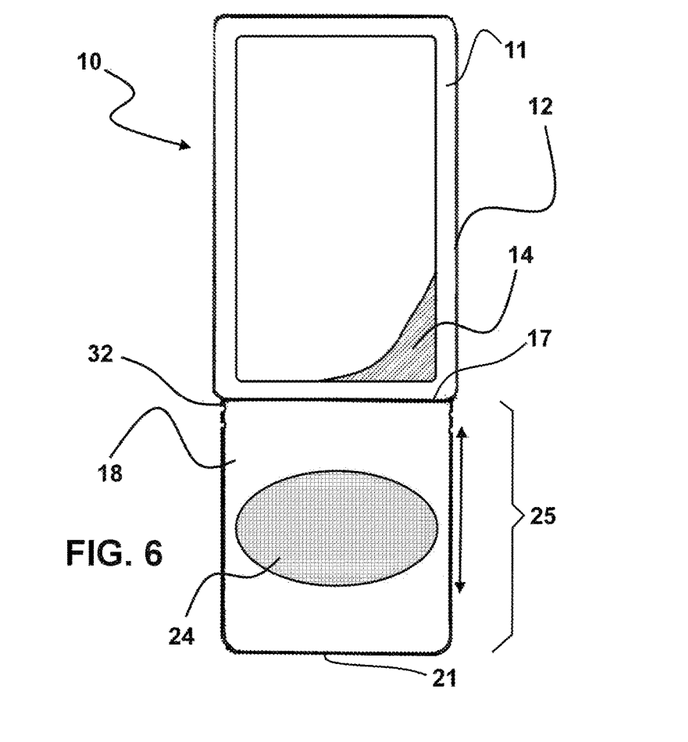
FIG. 6 depicts another mode of the device of FIG. 1, showing the projecting portion of the deflector extending between the bottom edge of the smartphone and a distal edge of the deflector having an elongated parabolic recess.

As shown in FIG. 6, the device 10 may be formed with differently shaped reflective curved areas 30, such a parabolic recesses 24 which are round as in FIG. 1, or more oval in circumference as shown in FIG. 6. Additionally shown in FIG. 6 are registration notches 32 which can interface with a deflecting pin located within the cavity 20, to hold the sound deflector 18 within the cavity 20. If included, the pin can also hold the length of protrusion of the sound deflector 18 from the cavity 20. This engagement of pin to notches 32 will removably maintain the deflector 18 in a deployed position to focus the voice of the user on the microphone 28. The plurality of notches 32 sequentially located along one or both edges of the sound deflector 18 body 22, will thus allow the user to pull it from the housing 12 and adjust it for the best focusing and voice transmission by the smartphone.

Figure 7:
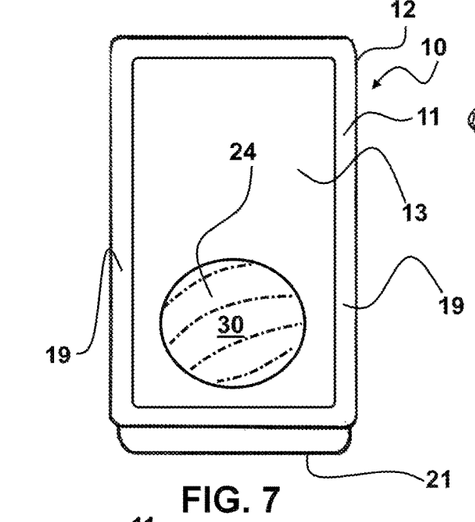
FIG. 7 depicts a mode of the device showing the housing which is U-shaped and has an open area in-between side rails which is adapted for projection of the parabolic recess therethrough.
Figures 11, 12:
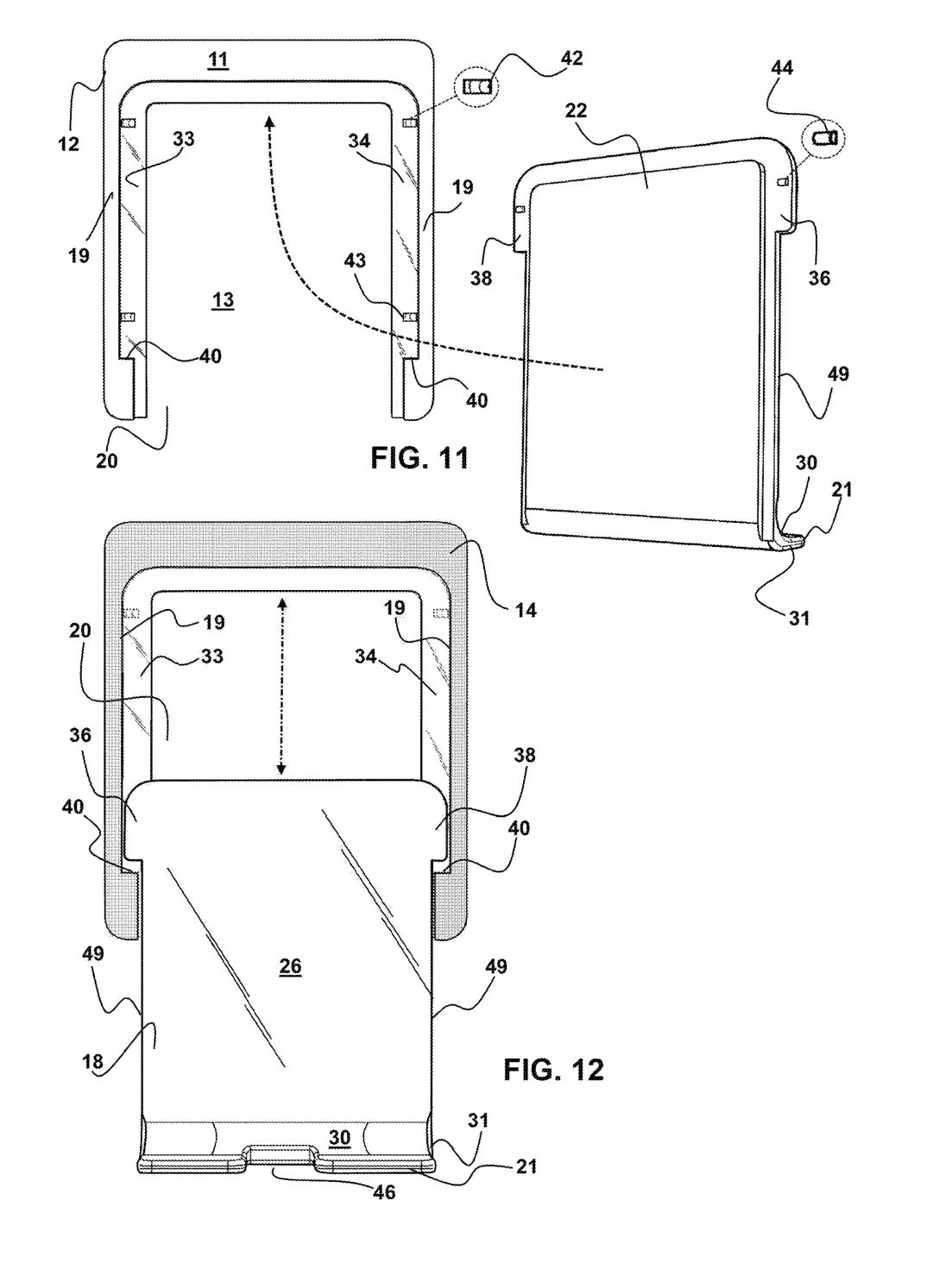
FIG. 11 depicts an exploded view of another particularly preferred mode of the device adapted for positioning in an adhesive or other engagement on the rear surface of a smartphone or smartphone case.
FIG. 12 shows the device as in FIG. 11 assembled to a sliding engagement.

In FIG. 7 is shown a mode of the device 10 having a housing 12 which is U-shaped such as in FIG. 11, and has an open area 13 in between parallel side rails 19 which are adapted to slidably engage with the opposing sides of the body 22 of the sound deflector 18. The adhesive 14 or other means for engagement to a phone or phone case, can be positioned on the side rails 19, instead of the central area of the housing 12 as shown in FIG. 12, or as in FIG. 1 on the surface of the housing 12 which will contact against the smartphone 16 or phone case. This configuration allows for a deeper depth of the curved reflective area 30 such as a parabolic recess 24 which extends from a rear surface of the body 22 of the deflector 18, to project through the open area 13 of the housing 12.

Figure 8:
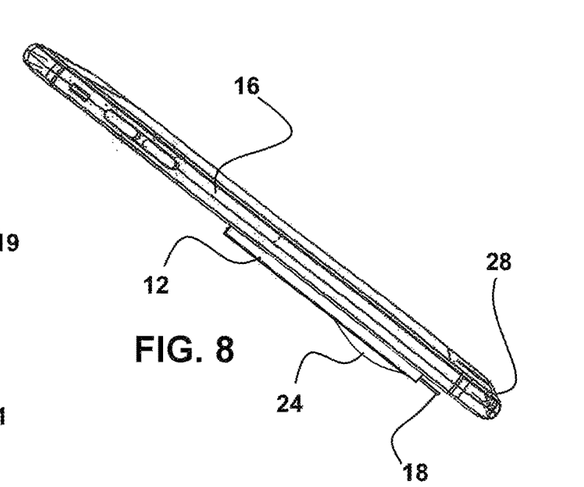
FIG. 8 depicts the device as in FIG. 7 with the sound deflector retracted and showing the parabolic recess projecting between the rails holding the body of the deflector in a sliding engagement.

FIG. 8 depicts the device 10 as in FIG. 7, showing the projecting side of the parabolic recess 24 formed into the body 22 of the deflector 18, projecting from the housing 12 through the open area 13. The housing 12, as noted, is engaged to the rear of a smartphone or case, using adhesive 14 or other means to hold the housing 12 operatively engaged to the rear of the smartphone 16.

Figure 9:
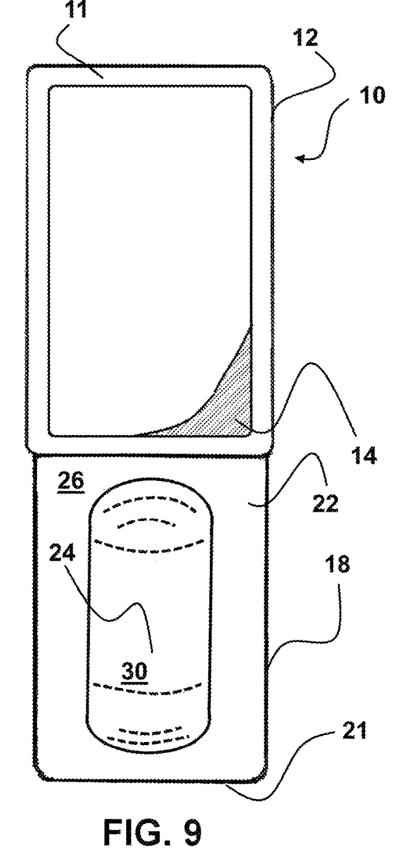
FIG. 9 shows a mode of the device with an elongated parabolic recess formed into the first surface of a projecting portion of the deflector.

FIG. 9 shows that the reflective curved area 30 such as formed by a parabolic recess 24, may be formed in an elongated configuration and is not limited to just the circular and oval and other configurations noted above. The housing 12 can have a width such as substantially 6 centimeters and a length such as substantially 8.3 centimeters, which size it to adhere to the rear of a smartphone. As shown, the sound deflector 18 would have a width adapted for a sliding engagement into and out of the cavity 20 of the housing 12 and the width of the parabolic recess 24 along the long axis would be such that it focuses the voice to a microphone such as substantially 3 centimeters.

Figure 10:
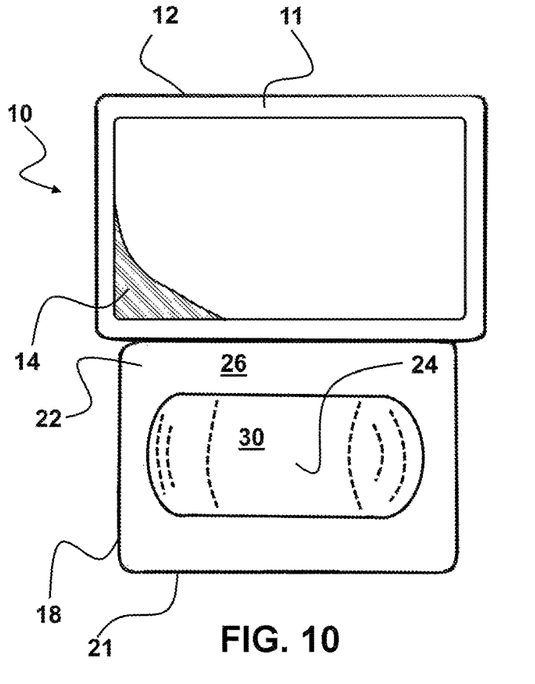
FIG. 10 depicts the device having a wider configuration for the housing and the elongated parabolic recess running parallel to the long axis of the housing.

In FIG. 10 is depicted the device 10, configured with a wider configuration than that of FIGS. 1-9, showing the housing 12 with the deflector 18 slidably engaged therein. An elongated reflective curved area 30 of the first surface 26, is formed as an elongated parabolic recess 24 which has an axis which runs parallel to the longer axis of the housing 12.

FIG. 11 depicts an exploded view of another particularly preferred mode of the device 10 which is adapted for positioning in an adhesive or other engagement, upon a rear surface of a smartphone or smartphone case engaged therewith. As shown, the housing 12 is substantially U-shaped and has a pair of side rails 19 on opposing sides of an open area 13. A first recess 33 is formed into a first of the side rails 19 and a second recess 34 is formed into a second of the side rails 19.

The attachment surface 11 of the housing 12, which is the surface which mates to the rear of the smartphone 16 or its case, has adhesive 14 positioned thereon (FIG. 12) which may be employed to engage the device 10 to the smartphone 16 of choice.

Additionally shown in FIG. 11, is the deflector 18, which has a body 22, configured to slidably engage with the housing 12. This sliding engagement is formed between a first shoulder 36 engaged within the first recess 33 and the second shoulder 38 engaged within the second recess 34. A contact of the shoulders 33 and 38 with a recess endwall 40 formed at the open end of the housing 12, forms a stop or limiter to the sliding of the deflector 18 toward the deployed position, thereby preventing detachment once the housing 12 in engaged to the smartphone 16 or case.

The device herein preferably has position locators which will hold the position of the deflector 18 either in the stowed position collapsed into the housing 12, or in the deployed position of FIG. 12, wherein it has been slid to a position locating the curved endwall 31 a distance from the bottom edge 17 of a smartphone 16, with a projecting portion 25 of the deflector 18 between the bottom edge 17 of the smartphone 16 and the endwall 31.

By position locator herein is meant a first position locator provided by a removable engagement between the housing 12 and the deflector 18 which will maintain the deflector 18 in the retracted or stowed position until pulled therefrom by force, and a second position locator in the form of a second removable engagement between the housing 12 and the deflector 18 which will hold the deflector 18 in the deployed position, until forced to slide toward the retracted or stowed position by the user pushing thereon.

A current preferred configuration of such position locators is shown in FIG. 11 which depicts cavities 42 which may be formed into the surface of one or both of the first recess 33 and second recess 34. These cavities 42 are shaped complimentary to one or more projections 44 extending from a surface of one or both shoulders 36 and 38. Because the body of the deflector 18 is formed of flexible material such as a polymeric material, the shoulders 36 and 38 will deflect slightly to disengage each projection 44 from a mating cavity 42 from the force when the deflector 18 is pulled toward the deployed position to thereby unlock the engagement therebetween.

Thus, one or more projections 44 engaged in a cavity 42 closest to the housing 12 on an end opposite the bottom edge 17 of the smartphone 16, provide a first such position locator and will hold the deflector 18 in the stowed position. One or more projection 44 engaged into a second cavity 43 formed into the housing 12, closest to the bottom edge 17 of the smartphone 16 when mounted, will form a second such position locator to maintain the deflector in the deployed position, until force from the user pushing on it slides it back to the retracted or stowed position.

Of course other position locators as would occur to those skilled in the art upon reviewing this specification may be employed, such as a ratcheting engagement of the shoulders 36 and 38 with the housing 12 such as by forming teeth on side edges of the shoulders 36 and 38 which slide upon mating teeth formed on the sides of the first and second recesses 33 and 34 only under force in one direction or the other.

FIG. 12 shows the device 10 as in FIG. 11 assembled to a sliding engagement. As shown the deflector 18, is pulled to the deployed position and held there by the second position locator noted above. This is the same configuration of the device 10 shown in FIG. 13, wherein the dotted line rectangle is provided to depict the smartphone 16 from the front side thereof on which the display 27 is located, and showing a view through the smartphone 16 of the device 10 engaged to the rear surface thereof as noted above.

Figure 13:
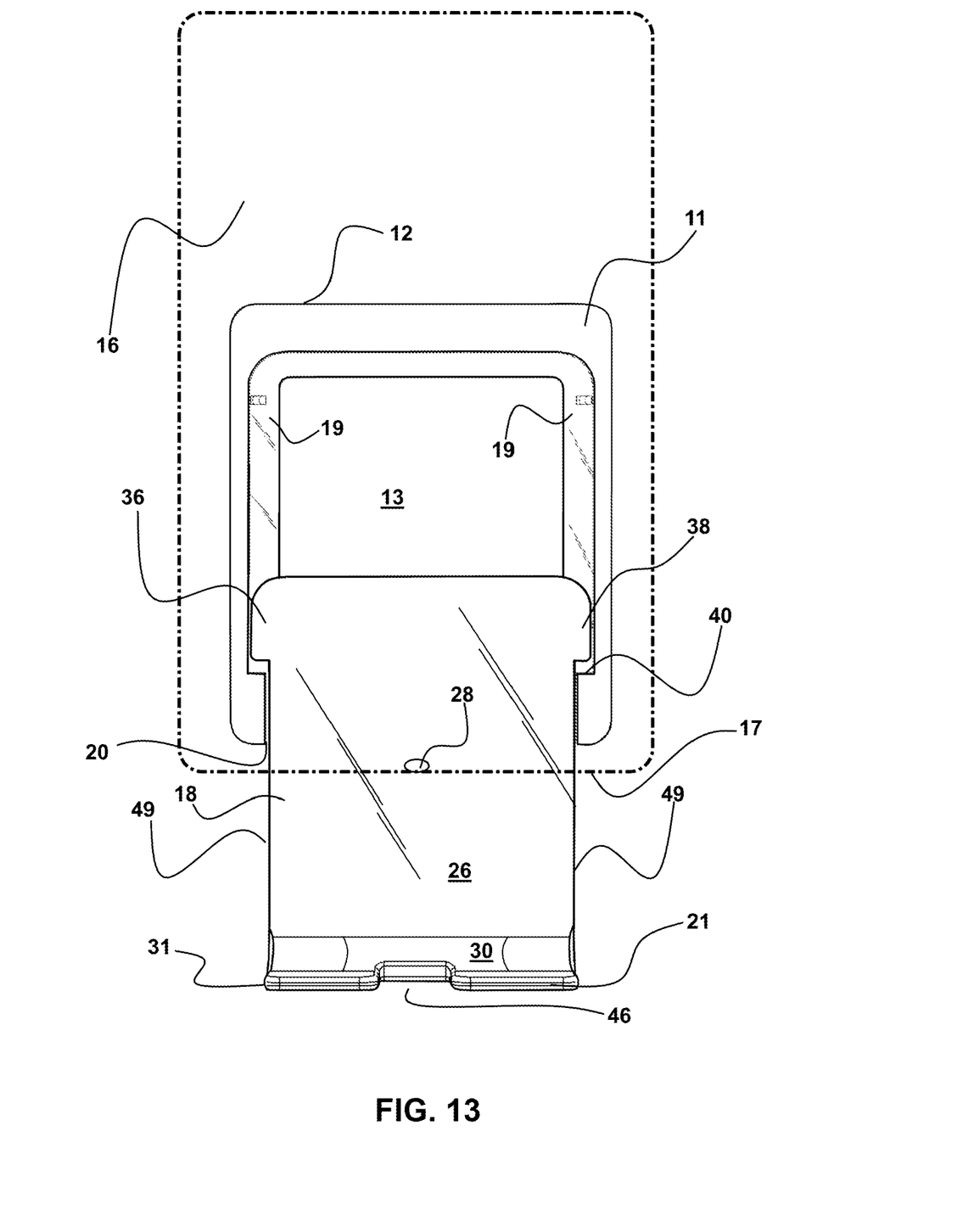
FIG. 13 depicts the assembled device of FIG. 12, in an as-used positioning of the projecting portion of the deflector, engaged to the rear surface of a smartphone or smartphone case, opposite the video display surface, as viewed from the front of such a smartphone through an outline depicting the smartphone.

In FIG. 13, is shown, the assembled device 10 of FIG. 12, in an as-used positioning engaged to the rear surface of a smartphone 16. As shown, the deflector 18 body 22 has been translated to a deployed position, and the shoulders 38 and 40 contact the recess endwall 40 to provide a stop or sliding limiter to the translation of the deflector 18 toward the deployed position.

As shown, the reflective curved area 30, is formed by a curved section of the body 22 of the deflector 18, at an intersection with the endwall 31 which projects above the first surface 26 of the deflector 18 to a distal end 21 of both the deflector 18 and the endwall 31.

This reflective curved area 30 on the first surface 26 at the intersection with the endwall 31, which is depicted as projecting substantially perpendicular to the planar first surface 26. However, the upward projection of the endwall 31 from the planar first surface 26 may run at an angle between twenty to ninety five degrees relative to the planar first surface 26 with a current favored angle being between 80 to 95 degrees.

The elongated curved surface 30 extends at the intersection of the endwall 31 with the first surface 26 for substantially the entire width of the first surface 26 in-between the two opposing side edges 49 of the deflector 18. This elongated curved surface 30 forms an operative reflective curved area 30 to capture, reflect, and reflect and focus sound waves to the microphone 28. The reflections of sound from this entire elongated curved surface 30 extending between the two side edges 49 has shown to provide a significant enhancement in sound from the voice of the user reaching the microphone of the smartphone 16, and to concurrently block ambient noise from reaching the microphone. Such has been found in experimentation to yield both noise canceling and an increase volume 10+ db.

Thus, the reflective curved area 30 will reflect sound waves contacting it during use, back toward the microphone 28. Further, because the microphone 28 may not be centered on or adjacent the bottom edge 17 of many smartphones 16, the wide curved area 30 insures that sound will be enhanced and reflected to microphones 28 located off center.

Figure 14:
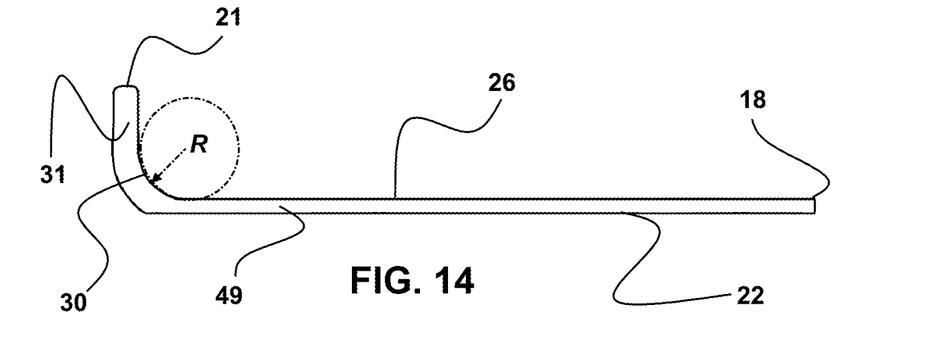
FIG. 14 depicts a side view of the sliding sound deflector of the device as in FIGS. 11-13.

As shown in FIG. 14, the reflective curved area 30 extending across the width of the deflector 18 currently curves in a radius R which currently is preferred as in a range substantially between 0.35 inches to 0.5 inches. Currently a radius substantially between 0.23 inches and 0.27 inches has been shown to maximize the increase in volume and decrease in noise noted above and as such is preferred.

A notch 46 may communicate through the endwall 31 from the distal edge 21. The notch 46 will provide an alternate path for sound waves to the microphone 28 when the deflector 18 is in the stowed position. This notch 46 may also define a passage for communication of a charging cord for engagement into a charging port on the end of the phone. This configuration also works well when the user tends to hold the phone at different angles during a conversation since the reflective curved area 30 extends the entire width of the first surface 26 of the deflector 18 extending to both side edges 49.

Figure 15:
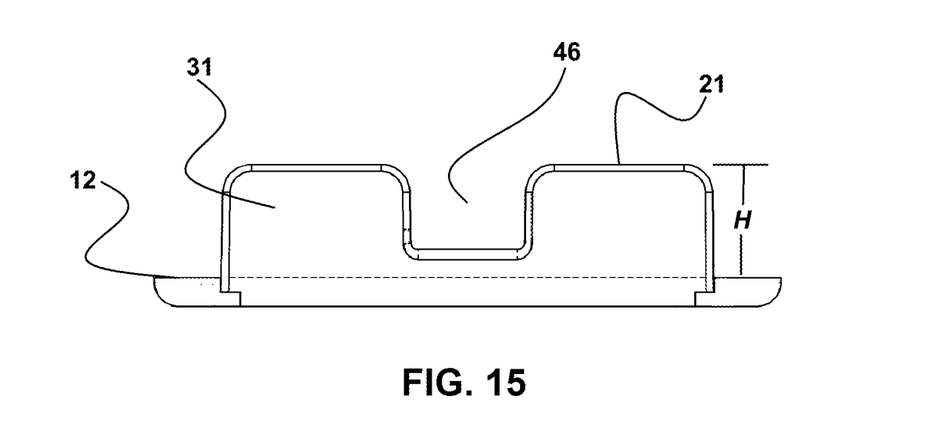
FIG. 15 is an end view of the sliding deflector of FIGS. 11-14.

As noted, FIG. 15 shows an end view of the sliding deflector 18 of FIGS. 11-14 and shows the endwall 31 having a height H running from the first surface 26 of the deflector 18 to to the distal edge 21 of the deflector 18. This height H, can vary and currently is preferred that the height H is between 0.4 inches to 0.7 inches which experimentation has shown to allow the device to enhance sound and reduce noise on a wide cross section of available smartphones 16. Currently particularly favored is a height H substantially 0.47 inches.

Also shown in FIG. 15 is the notch 46 which extends from the distal edge 21 into the endwall 31. As noted, this notch 46 can be located to allow passage of a charge cord to be plugged into the phone, and it also provides a path for sound to reach the microphone of the smartphone 16 when the deflector 18 is in the retracted or stowed position.

While all of the fundamental characteristics and features of the sound enhancing invention for a smartphone have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are considered included within the scope of the invention as defined by the following claims.

What is claimed is:

1. A sound enhancing apparatus for a smartphone, comprising:
    a housing having an attachment surface;
    said attachment surface configured for an engagement to a smartphone rear surface or to a portion of a phone case covering said rear surface;
    a deflector in a sliding engagement with said housing, said deflector movable in said sliding engagement between a stowed position and a deployed position;
    said deflector having a first surface facing toward said rear surface of said smartphone;
    said deflector in said deployed position having a projecting portion thereof, said projecting portion extending between said bottom edge of said smartphone to a distal edge of said deflector;
    a reflective curved area positioned on said first surface of said deflector; and
    said deflector in said deployed position positioning said reflective curved area to reflect sound waves contacting said reflective curved area toward a microphone of said smartphone.

2. The sound enhancing apparatus of claim 1, additionally comprising:
    said reflective curved area having a parabolic shape.

3. The sound enhancing apparatus of claim 1, additionally comprising:
    a first position locator for maintaining the deflector in said stowed position; and
    a second position locator for maintaining the deflector in the deployed position.

4. The sound enhancing apparatus of claim 1, additionally comprising:
    a curved section of the deflector at the distal end thereof;
    said curved section forming a curved endwall;
    said reflective curved area being elongated and formed upon an area of said first surface positioned upon said curved endwall.

5. The sound enhancing apparatus of claim 4, wherein said reflective curved area has a radius of substantially 0.35 inches to 0.5 inches.

6. The sound enhancing apparatus of claim 5, wherein said reflective curved area has a radius of substantially 0.23 inches and 0.27 inches.

7. The sound enhancing apparatus of claim 4, additionally comprising:
    a first position locator for maintaining the deflector in said stowed position; and
    a second position locator for maintaining the deflector in the deployed position.

8. The sound enhancing apparatus of claim 4, additionally comprising:
    a notch formed into said endwall, said notch providing a path for engagement of a charging cord to said smartphone; and
    said notch forming a pathway for sound communication to said microphone with said deflector in said stowed position.

9. A sound enhancing apparatus for a smartphone of claim 1 wherein said reflective curved area is positioned between said distal edge of said deflector and said bottom edge of said smartphone with said deflector located in said deployed position.

10. The sound enhancing apparatus of claim 9, additionally comprising:
    a first position locator for maintaining the deflector in said stowed position; and
    a second position locator for maintaining the deflector in the deployed position.

11. The sound enhancing apparatus of claim 9, additionally comprising:
    said reflective curved area having a parabolic shape.

12. The sound enhancing apparatus of claim 9, additionally comprising:
    a curved section of the deflector at the distal end thereof;
    said curved section forming a curved endwall;
    said reflective curved area being elongated and formed upon an area of said first surface positioned upon said curved endwall.

13. The sound enhancing apparatus of claim 12, wherein said reflective curved area has a radius of substantially 0.35 inches to 0.5 inches.

14. The sound enhancing apparatus of claim 12, wherein said reflective curved area has a radius of substantially 0.23 inches and 0.27 inches.

15. The sound enhancing apparatus of claim 12, additionally comprising:
    a first position locator for maintaining the deflector in said stowed position; and
    a second position locator for maintaining the deflector in the deployed position.

16. The sound enhancing apparatus of claim 12, additionally comprising:
    a notch formed into said endwall, said notch providing a path for engagement of a charging cord to said smartphone; and
    said notch forming a pathway for sound communication to said microphone with said deflector in said stowed position.

\* \* \* \* \*